United States Patent Office.

HENRY B. COBB, OF WILMINGTON, DELAWARE.

METHOD OF MANUFACTURING INSULATING-TUBING FOR ELECTRIC CONDUCTING-WIRES.

SPECIFICATION forming part of Letters Patent No. 440,395, dated November 11, 1890.

Application filed April 29, 1890. Serial No. 349,903. (No specimens.)

*To all whom it may concern:*

Be it known that I, HENRY B. COBB, a citizen of the United States, residing at Wilmington, in the county of New Castle and State of Delaware, have invented a new and useful Improvement in the Method of Manufacturing Insulating-Tubing for Electric Conducting-Wires, of which the following is a specification.

The object of my invention is to provide an expeditious, simple, and comparatively inexpensive manner of procedure for the production of hard insulating-tubing for electric wires, and to this end I proceed as follows:

The material from which I form the tubing is rubber or a compound thereof, prepared for vulcanization, though my improvement is useful whatever be the vulcanizable material employed in the formation of the hard tubing. The prepared rubber, which is supplied to the trade in the form of sheets, is cut into strips of suitable size to enable them to be readily fed to a tube-forming machine, from which it emerges as continuous soft tubing in any desired length, and which should be carefully coiled in a suitable horizontally-disposed rotary receiving-pan, and dusted in the coiling operation with some material which will prevent cohesion of the coils, such as powdered soapstone. The proceeding thus outlined, and which is not in itself novel, may or may not form the first step of my method. In the latter case the first step of my improved method would consist in preparing the already-formed soft tubing for vulcanization. This I accomplish by coating it with metal, which is best done by passing it through a lead-press, as described in Letters Patent of the United States No. 408,374, granted me on the 6th day of August, 1889. As the lead-covered soft tubing emerges from the lead-press, it should be cooled and coiled for handling on a suitable reel, in which condition it is ready to be subjected to a vulcanizing temperature, preferably by introducing it into and maintaining it for the required period of time in a bath composed of a liquid—such as molten paraffine—capable of being readily heated to a vulcanizing temperature, and in the event of such manner of practicing the vulcanizing step of my improved method, which is clearly set forth in Letters Patent of the United States No. 408,376, granted me on the 6th day of August, 1889, the lead-covered soft tubing should first be supplied with and have confined within it a fluid (preferably air introduced under pressure) which will expand under the effect of the vulcanizing heat, and both prevent collapsion of the soft tubing and produce expansion and compacting thereof against the interior surface of the inclosing-tube of lead. When thus prepared, the coiled lead-coated soft-rubber tube is immersed in the bath of melted paraffine raised to a proper temperature and there allowed to remain until vulcanized to the desired degree, when it is removed from the bath and cooled by exposure to a suitable cooling influence as that of cold water or the air.

The last step of my improvement, and that which lends novelty to it as a method, relates to baring the vulcanized tubing to permit of practical application thereof in its naked condition or to prepare it for subsequent treatment, such as that described in either of my Letters Patent of the United States No. 429,304 or No. 429,305, both issued on the 3d day of June, 1890. I remove the lead covering by stripping it from the vulcanized tubing, the stripping operation being best accomplished by cutting the lead lengthwise of the tubing on two sides thereof and pulling or otherwise forcing the divided parts of the metal covering away from the vulcanized tubing inclosed in it.

A machine suitable for performing the stripping operation thus described expeditiously and reliably is shown and described in Letters Patent of the United States No. 429,292, issued to Duncan Thatcher on the 3d day of June, 1890.

What I claim as new, and desire to secure by Letters Patent, is—

1. The method of manufacturing vulcanized insulating-tubing for electric wires, which consists in molding upon the tubing while in a soft condition a continuous covering of metal, vulcanizing the soft tubing inside its metal covering, and stripping the metal from the vulcanized tubing, substantially as described.

2. The method of manufacturing vulcanized insulating-tubing for electric wires, which consists in molding upon the tubing while in a soft condition a continuous covering of metal, vulcanizing the soft tubing inside its metal covering, cutting the metal covering along different sides of the tubing lengthwise thereof, and forcing it apart and away from the inclosed vulcanized tubing along the lines of severance, substantially as described.

HENRY B. COBB.

In presence of—
J. W. DYRENFORTH,
M. J. FROST.